United States Patent [19]

Fischer et al.

[11] Patent Number: 5,068,038

[45] Date of Patent: Nov. 26, 1991

[54] METHOD OF LOWERING THE AOX CONTENT IN WATER

[75] Inventors: Joachim Fischer, Rodenbach; Hubert Wolf, Hammersbach, both of Fed. Rep. of Germany

[73] Assignee: Degussa Aktiengesellschaft, Frankfurt, Fed. Rep. of Germany

[21] Appl. No.: 584,081

[22] Filed: Sep. 18, 1990

[30] Foreign Application Priority Data

Sep. 27, 1989 [DE] Fed. Rep. of Germany ....... 3932174

[51] Int. Cl.$^5$ .............................................. C02F 1/28
[52] U.S. Cl. .................................. 210/662; 210/691; 210/717; 210/746; 210/724; 210/726; 210/908; 210/709
[58] Field of Search ............... 210/709, 717, 724, 726, 210/722, 746, 691, 908, 909, 759, 662

[56] References Cited

U.S. PATENT DOCUMENTS

| | | | |
|---|---|---|---|
| 4,131,543 | 12/1978 | Carosello | 210/909 |
| 4,416,786 | 11/1983 | Knorre et al. | 210/908 |
| 4,595,509 | 6/1986 | Fox et al. | 210/691 |
| 4,758,346 | 7/1988 | Johnson | 210/908 |

FOREIGN PATENT DOCUMENTS

| | | | |
|---|---|---|---|
| 0238731 | 9/1987 | European Pat. Off. | |
| 3103126 | 10/1982 | Fed. Rep. of Germany | |
| 92549 | 8/1978 | Japan | 210/722 |
| 108459 | 8/1979 | Japan | 210/717 |
| 129750 | 10/1979 | Japan | 210/722 |
| 47196 | 4/1980 | Japan | 210/722 |
| 264106 | 11/1988 | Japan | 210/908 |
| 1597342 | 9/1981 | United Kingdom | |

Primary Examiner—Stanley S. Silverman
Assistant Examiner—Neil M. McCarthy
Attorney, Agent, or Firm—Cushman, Darby & Cushman

[57] ABSTRACT

The content of halo-organic pollutants in water is lowered to residual AOX values below 1 mg/l, preferably below 0.1 mg/l by adjusting the $Fe^{2+}$ comtent of the water to 20 to 1000 mg/l, adding a precipitated or pyrogenic silicic acid, converting 20 to 1000 mg of the $Fe^{2+}$ into $Fe^{3+}$ by adding in an oxidation agent, preferably hydrogen peroxide, and separating the iron (III) hydroxy complexes formed and the silicic acid, which contain the halo-organic pollutants in an adsorbed state, at pH 5-10. The method can be controlled in a simple manner as regards the addition of $Fe^{2+}$ and oxidation agent via the $Fe^{2+}/Fe^{3+}$ redox potential.

13 Claims, No Drawings

METHOD OF LOWERING THE AOX CONTENT IN WATER

The present invention relates to a method of reducing the content of organo-halogen pollutants in water to residual AOX values below 1 mg/l. The total content of these pollutants is indicated in the form of the so-called AOX content, which signifies the amount of organically bound halogen per liter of water.

The method of the present invention is directed in particular to the treatment of waste dump seepage water and contaminated ground water which also contain short-chain halogenated hydrocarbons in addition to chlorinated aromatic, heteroaromatic, cycloaliphatic and long-chain pollutants. The method is one-stage and can be controlled electrometrically.

BACKGROUND OF THE INVENTION

The separation of halogen-organic pollutants from water, especially waste water, is becoming more important for toxicological and ecotoxilogical reasons. Thus, it is necessary to treat e.g. seepage water from waste dumps as well as ground water contaminated with halogen-organic pollutants. On the one hand, seepage water from waste dumps can have a very adverse impact on fauna and flora if it is passed without pretreatment into a waterway and, if it is introduced into a biological water-purification plant, it can severely disturb or even prevent its operation. On the other hand, seepage into the ground can result in contamination of the ground water, which can prevent the ground water from being used as a source of drinking water. The treatment of ground water contaminated with halogen-organic pollutants is necessary in order to prevent it from spreading.

The following physicochemical methods are currently available for the treatment of seepage water and ground water containing halogen-organic pollutants, which water also generally contains other organic and inorganic pollutants in a greater or lesser amount—cf. K. Leonhard in "Berichte aus Watergütewirtschaft und Gesundheitsingenieurwesen der Technischen Universität München" [Reports on Water-Quality Economy and Sanitary Engineering of the Technical University of Munich] No. 74 (1987), pp. 230–237: Liquid-Liquid Extraction, Stripping with Steam and Air, Mono- or Bidistillation, Adsorption onto Activated Carbon.

Because of the complex composition of the water in question, total removal of the pollutants which disturb a biological purification stage is generally only possible by means of a combination of different and/or multistage methods. This requires a considerable expense for putting into operation and operating systems suitable for this purpose. Because of the partially rapidly changing composition of the water, those methods are particularly interesting which can be reliably regulated during continuous operation and are thus economical to operate.

Chloro-organic compounds can be separated from an aqueous phase by liquid-liquid extraction; however, total separation is only assured by means of a four-stage extraction. A further disadvantage is the fact that emulsions form in seepage water and an adsorption stage must be added after the extraction.

As a result of the stripping of halogen-organic pollutants with steam or air, the pollutants are distributed both into the strip phase as well as into the actual water phase so that the halogen-organic pollutants contained in them must be removed from both phases by means of further methods, e.g. adsorption or combustion.

Evaporation methods are energy-intensive and, in addition, halogen-organic pollutants, including not only short-chain halogenated hydrocarbons but even perchlorinated dibenzodioxins and dibenzofurans, can be expelled with the vapors. Therefore, other purification steps, e.g. adsorption on activated carbon, must be included.

The adsorption of aromatic, heteroaromatic, cycloaliphatic and aliphatic halogen compounds contained in highly contaminated waste water or seepage water on activated carbon can only be considered as a post-treatment stage since a direct use would require an extremely large amount of carbon and, in addition, a multi-stage adsorption system. Moreover, it would then be necessary to dispose of large amounts of contaminated activated carbon.

The determination of AOX is also based on the adsorption of halogen-organic pollutants on activated carbon: The halogen-organic pollutants are absorbed along with other water components on a very pure, halogen-free activated carbon (e.g. Merck, Darmstadt, item No. 2216); the chlorine content is determined in a known manner after incineration.

Experience with the treatment of seepage water with inclusion of adsorptive measures are disclosed in the journal "Korrespondenz Abwasser" [Waste Water Correspondence] 35, 9/1988, pp. 927–930. A multi-stage adsorption system using clays and activated carbons did not provide a reliable reduction of the AOX value below 1 mg/l. Better results can be obtained if an activated-carbon treatment by means of a stirring-in technique is followed by a fixed-bed filtration; however, this increases the expense. Frequently, additional treatment stages are necessary in the presence of readily volatile halogenated hydrocarbons such as especially $C_1$- and $C_2$ haloalkanes as well as $C_2$ haloalkenes.

It is also known that pollutants can be eliminated from waste water by means of flocculation or precipitation using, in particular, compounds of trivalent iron and the formation of iron (III) hydroxy complexes. The pollutants are partially enclosed in the floc and/or adsorptively and/or chemically bound in the form of Fe complexes, which renders them separable. Thus, for example, the COD and BOD values of seepage water can be lowered; however, combination with an absorption on activated carbon is considered necessary—cf. H. J. Ehrig in "Deponie: Ablagerung von Abfällen [Waste Dump: Storage of Refuse]/ K. J. Thomé-Kozmiensky" (1987), pp. 560–579. In order to reduce the organic halogen content to values below 1 mg Cl/1 water, it is necessary to use a flocculation precipitation with iron (III) chloride, followed by a treatment with activated carbon—cf. A. Denne and E. Ecker in "Altlasten [Abandoned Polluted Areas]/K. J. Thomé-Kozmiensky" (1987), pp. 649–656.

Oxidation with hydrogen peroxide in the presence of a catalytic amount of $Fe^{2+}$ also has been evaluated for the treatment of seepage water with chloro-organic compounds which are difficult to degrade biologically—cf. E Gilbert and F. Bauer, Kernforschungszentrum Karlsruhe [Karlsruhe Atomic Research Center], KfK 4030, Febr. 1986. A large part of the organic pollutants can be degraded at a pH below 5 using 1 g $H_2O_2$ per g of chemical oxygen demand (COD), an $H_2O_2$/$Fe^{2+}$ molar ratio of 10 : 1 (Fenton's reagent) and a reaction time of about one hour. Under these conditions, it was possible to reduce the AOX value as a measure of halogen-organic pollutants, but not much below 1 mg/l. If the pH is adjusted to 7–8 after the oxidation, iron (III) hydroxy complexes (=iron (III) oxide hydrate) precipitate, which contain a part of the organic carbon, adsorbed and enclosed; however, this has only a small effect on the residual content of chloroorganic pollutants in the treated water and it was possible to reduce the AOX value only by a total of about 92% even when a biological purification stage was added.

SUMMARY OF THE INVENTION

The object of the present invention is to provide a method of separating all halogen-organic pollutants from water which contains other organic and inorganic pollutants. The method permits the AOX content to be lowered, in a single stage, to residual values below 1 mg/l, by adsorption of the halogen-organic pollutants on iron (III) hydroxy complexes formed in situ. The method is also easy to control and is capable of being reliably operated with as low usage of chemicals and as little accumulation of contaminated products as possible, even when the pollutant content in the water to be treated varies widely.

These and other objects are achieved by a method of lowering the content of halogen-organic pollutants in water which can also contain other organic and/or inorganic pollutants, to values (residual AOX values) below 1 mg organically bound halogen per liter. The method includes adsorption of the halogen-organic pollutants on iron (III) hydroxy complexes formed in situ by the hydrolysis of iron (III) salts in the presence of a further adsorption agent. The adsorption agents are separated in flocculated form at pH 7 to 10. The $Fe^{2+}$ content in the water is determined and, to the extent required, a content of 20 to 1000 mg $Fe^{2+}$ per liter water is maintained by addition of an iron (II) salt. An oxidation agent is subsequently added for converting $Fe^{2+}$ into $Fe^{3+}$. The amount of oxidation agent which is added is sufficient for oxidation of at least 20 mg $Fe^{2+}/l$ up to the amount required for the oxidation of all of the $Fe^{2+}/l$ present, in the presence of any other components which can be oxidized practically instantaneously in a manner similar to $Fe^{2+}$. A precipitated or pyrogenic silicic acid with a specific surface of above 50 $m^2/g$ is used as the second adsorption means, and it is present in an amount of 50 to 1000 mg/l during the flocculation of the iron (III) hydroxy complexes. The method is particularly useful when the water to be treated is waste dump seepage water or contaminated ground water and that the AOX content comprises halo-organic pollutants which contain 1 to 4 carbon atoms. The process can reduce the AOX content to values below 0.2 mg/l, preferably below 0.1 mg/l.

Preferably, an inorganic active-oxygen compound, especially a persulfate, percarbonate or, particularly hydrogen peroxide are used as the oxidation agent.

It is also preferred that the iron (II) salt is added to the water in such an amount that the content is 50 to 400 $Fe^{2+}/l$, preferably 100 to 200 mg $Fe^{2+}/l$ and that essentially the entire $Fe^{2+}$ present is converted into $Fe^{3+}$ by means of the addition of the oxidation agent. It is desirable that the iron (II) salt as well as the oxidation agent ar added in the form of aqueous solutions to the water to be treated and that the amounts added are controlled by measuring the $Fe^{2+}/Fe^{3+}$ redox potential. A redox potential in the range of +450 to 600 mV can be maintained using a platinum/Thalamid electrode by adding an aqueous iron (II) salt solution and hydrogen peroxide may be subsequently added as the oxidation agent until the redox potential reaches a value of +980 mV.

Also preferred is that 50 to 500 mg/l, preferably 50 to 200 mg/l, silicic acid is added to the water to be treated before the oxidation.

The water to be treated in accordance with the invention can be of various origins, e.g. process water, waste water or, especially preferably, waste dump seepage water and contaminated ground water. After the treatment, the water can be moved, to the extent necessary, to a biological water purification plant. The sludge consisting of iron (III) hydroxy complexes, also designated as iron (III) oxide hydrate, which sludge accumulates as the method is carried out, contains not only all the halogen-organic pollutants separated from the water but it can also contain a number of other components of the water such as e.g. iron-humic acid complexes and heavy-metal cyanides in the case of waste dump seepage water. It is thus not only possible according to the invention, to separate the halo-organic pollutants, but also to simultaneously lower the CSB value (chemical oxygen demand) and, if applicable, the heavy-metal content.

The halo-organic pollutants to be separated are halogen compounds containing 1 to 4 carbon atoms, longer-chain halogenated hydrocarbons, halogenated aromatics, heterocyclics and cycloaliphatics. Examples from the group of $C_1$–$C_4$ halogen compounds are methylene chloride, chloroform, carbon tetrachloride, di-, tri- and tetrachloroethane, vinyl chloride, vinylidene chloride, triand tetrachloroethylene, allyl chloride, 1,4-dichlorobutene; examples of pollutants with at least 5 carbon atoms are polychlorinated dibenzodioxins and dibenzofurans, polychlorinated benzenes, chlorophenols and halogen-containing pesticides. The method of the invention is especially useful when the water contains $C_1$–$C_4$ halogen compounds, especially $C_1$- and $C_2$ haloalkanes and -alkenes, which contribute to the total AOX content.

The separation of the $C_1$–$C_4$ halogen compounds remains incomplete without the addition, in accordance with the invention, of a highly disperse silicic acid. The invention is capable of lowering the AOX value, in one stage, to below 1 mg/l, preferably below 0.2 mg/l and especially preferably below 0.1 mg/l. It was surprising that $C_1$–$C_4$ halogen compounds can be separated substantially quantitatively by means of the presence of silicic acids during the formation of the iron (III) hydro complexes, whereas using only silicic acids or adding them after the completed flocculation of the Fe (III) hydroxy complexes, does not achieve the desired effect.

The flocculation and precipitation are achieved by means of iron (III) hydroxy complexes which are formed in situ by the hydrolysis of iron (III) compounds. This flocculation and precipitation permit the separation of colloidal components and of components which are dissolved to a varying degree in the water, by means of adsorption and/or inclusion. This is per se known and practiced in waste-water technology. Usually, a soluble iron (III) compound is added to the water and the precipitation begins above a pH of approximately 3.5, which precipitation is practically quantitative at pH 5. Frequently, a pH above 7 is used in order to form a precipitate which can be dewatered and separated more readily by gravity. It was found that even halogen-organic pollutants can also be separated to a certain extent by means of this flocculation. However, residual AOX values below 1 mg/l cannot be achieved in this way. It was therefore not foreseeable that the addition of an oxidation agent to water containing 20 to 1000 mg $Fe^{2+}$/l brings about the formation of iron (III) hydroxy complexes in situ which adsorb halogen-organic pollutants with at least 5 carbon atoms and, in the presence of a small amount of silicic acid, substantially quantitatively removes halogen-organic pollutants having 1 to 4 carbon atoms, or binds them in another manner, so that they can be separated at pH 5 to 10.

The water to be treated should have a content of 20 to 1000 mg $Fe^{2+}$/l, preferably 50 to 500 mg/g and especially preferably 100 to 200 mg/g. This $Fe^{2+}$ content can be present either entirely or partially in the water to be treated or it can be achieved by addition of a soluble iron (II) compound, preferably $FeSO_4 7 H_2O$ or $FeCl_2$. The iron (II) compound is usually added as an aqueous solution since this provides a simple method of metering the required amount and distributing it in the waste water. The addition may be, e.g., electrometrically controlled and operated in a continuous manner. In principle, the $Fe^{2+}$ content can also be above 1000 mg/l; however, this is less desirable because of the sludge volume which results, and it is not necessary for separation of the halo-organic pollutants. It can be advantageous, in the case of very low $Fe^{2+}$ contents, to add a polymeric auxiliary flocculation agent after the oxidation process of the invention has been carried out and, to the extent it is necessary, after an adjustment of the pH, in order to improve the flocculation and to separate the precipitate more readily.

An oxidation agent is added to the water containing a sufficient amount of $Fe^{2+}$ for the oxidation of the $Fe^{2+}$ to $Fe^{3+}$. It is a feature of the method of the invention that the amount of oxidation agent is measured in such a manner that at least 20 mg $Fe^{2+}$/l to a maximum of the amount of $Fe^{2+}$/l present, that is, a maximum of 1000 mg $Fe^{2+}$/l, are oxidized, in the presence of any other organic and/or inorganic components of the water to be treated which can be oxidized practically instantaneously in a manner similar to $Fe^{2+}$. Preferably, essentially the entire amount of $Fe^{2+}$ present is oxidized. Thus, no oxidation agent is available for the oxidative attack of carbon atoms. The previously known oxidative treatment of waste dump seepage water using Fenton's reagent always required a multiple excess of the oxidation agent in relation to $Fe^{2+}$ without being able to sufficiently degrade and separate the halo-organic pollutants. Substances which can be oxidized in a manner similar to $Fe^{2+}$ include those which compete in a significant manner with the $Fe^{2+}$ under the operating conditions— generally 5°-25° C.—for the oxidation agent added; this includes e.g. organic and inorganic sulfides and sulfites.

In principle, those oxidation agents can be used which have a greater oxidation potential than $Fe^{3+}$; however, only those are considered in practice which do not add any new pollutants to the water. Chlorine, hypochlorite and chlorine dioxide can be used; however, they are less desirable on account of the associated salting and the expense required for safety reasons. Oxygen as oxidation agent has the disadvantage that considerable emissions of odors can occur in the treatment of strongly contaminated water such as waste dump seepage water. An ozonizing is possible, but as a rule it is not very economical. Inorganic available oxygen compounds such as, in particular hydrogen peroxide, persulfuric acid, persulfates, sodium percarbonate and sodium perborates are preferred. Hydrogen peroxide in the form of commercially available aqueous solutions having a content of 30-85 % by weight is especially preferred; if desired, solutions more dilute than 30 % by weight can also be used.

50 to 100 mg/l of a highly disperse silicic acid are added to the water to be treated before or during, preferably before, the flocculation of the iron (III) hydroxy complexes, which commences or goes to completion generally during the oxidation of the $Fe^{2+}$ to $Fe^{3+}$ by hydrolysis—insofar as the pH does not drop below 3.5. The amount of silicic acid which is added is preferably kept as low as possible, which amount can be readily determined by a preliminary test. An added amount of 50-500 mg/l and especially preferably 50 to 200 mg/l is generally sufficient to lower the AOX content not only below 1 mg/l but even under 0.1 mg/l. The highly disperse silicic acid should have a specific surface of above 50 $m^2$/g, preferably 150 to 300 $m^2$/g. Precipitated silicic acids or pyrogenic silicic acids or silica gels can be used.

The method of the invention can be controlled in a very simple manner by measuring the $Fe^{2+}/Fe^{3+}$ redox potential. The $Fe^{2+}/Fe^{3+}$ redox potential, which can be measured in a known manner e.g. using a noble-metal electrode and a reference electrode, can be used both for determining the $Fe^{2+}$ content as well as for metering the oxidation agent since a substantially constant potential value of +970 to 980 mV (Pt/Thalamid electrode) is achieved upon the complete conversion of $Fe^{2+}$ into $Fe^{3+}$. Using the specified electrode, a potential of +450 mV corresponds to approximately 1000 mg $Fe^{2+}$/l and a potential value of +600 mV to approximately 70 mg $Fe^{2+}$/l—measured at pH 7.2. A redox regulator with P- (=proportional), PI- (=proportional-integral) PID- (=proportional-integral differential) operation can be used for controlling the metering device for the addition of the $Fe^{2+}$ salt solution which addition is appropriate to the requirement; the use of an MP (memory-programmable) control is also possible. The metering pump for the oxidation agent is closed automatically when the predetermined final potential value has been reached.

The pH of the water to be treated can be in the slightly acidic to the slightly alkaline range, approximately pH 5-9, at the start. During the oxidation, the pH drops according to the $Fe^{2+}$ content as well as according to the buffering capacity of the water. To the extent that the pH is below 5 after the addition of the oxidation agent, the precipitation of Fe (III) hydroxy complexes, which usually begins during the addition of the oxidation agent, is completed by a subsequent addition of an alkali compound or alkaline-earth compound with an alkaline action.

As has already been explained, the precipitate consisting of Fe (III) hydroxy complexes and silicic acid, and containing the adsorbed halogenated pollutants and any other pollutants, is separated at pH 5-10, preferably 7.5-9 from the water. Current devices such as thickeners, separators, centrifuges and filter presses can be used for the separation. The separated precipitate containing the pollutants can be supplied to a combustion system.

Very low residual AOX values can be obtained by means of the method of the invention with simple measures and a low expenditure of chemicals, which method can be controlled in a reliable manner at the same time.

DETAILED DESCRIPTION OF PREFERRED EMBODIMENTS

The invention is illustrated in the following examples.

EXAMPLE 1

Waste dump seepage water and ground water usually accumulate in a pH range of 6.5 to 7.5. At this pH, the $Fe^{2+}$ which is dissolved in it or was added to it is present in dissolved form, so that the concentration can be determined as a function of the measured redox potential by means of a calibration curve prepared in advance.

a) 5 l seepage water from a special garbage waste dump with a pH of 6.2, an $Fe^{2+}$ content of 970 mg/l and an AOX content of 12 mg/l were first mixed with a dilute aqueous solution of hydrogen peroxide and the addition of the $H_2O_2$ terminated upon attainment of an $Fe^{2+}/Fe^{3+}$ redox potential of +980 mV—measured with a platinum/Thalamid electrode (Thalamid is the designation of the firm Scholl & Sen., Mainz for the reference electrode). The mixture was filtered after adjustment to a pH of 8.5 by adding sodium hydroxide solution. The residual AOX content was 4.9.

b) The same seepage water as in a) was treated in accordance with the invention by adding 100 mg of a pyrogenic silicic acid with a specific surface of 200 $m^2/g$ before the addition of $H_2O_2$; using a method of operation which was otherwise the same, the residual AOX content was below 0.05 mg/l.

EXAMPLE 2 a) Seepage water from a household garbage waste dump had a pH of 7.8 and an AOX content of 2.4 mg/l. 200 mg $Fe^{2+}$ in the form of a 5 % by weight solution of $FeSO_4.7 H_2O$ were added in an electrometrically controlled manner. A redox potential of +465 mV developed (platinum/Thalamid electrode). Subsequently, aqueous $H_2O_2$ was added until a potential of +980 mV was reached, which corresponded to oxidation of the entire $Fe^{2+}$ present. The mixture was filtered after pH adjustment to 8.5 using aqueous calcium hydroxide. The residual AOX content was unchanged—2.4 mg/l. The AOX value resulted essentially from $C_1$- and $C_2$ chlorinated hydrocarbons.

b) The same water was treated in accordance with the invention by adding 50 mg of a precipitated silicic acid (specific surface 170 $m^2/g$, particle size 20 $\mu m$) after the completion of the addition of $Fe^{2+}$—redox potential +470 mV per 1. Subsequently, aqueous $H_2O_2$ was introduced until a redox potential of +975 mV was achieved. After pH adjustment with aqueous calcium hydroxide to 8.5 and filtration, a residual AOX content of below 0.05 mg/l was achieved.

What is claimed is:

1. A method of lowering the content of halo-organic pollutants in water, to residual AOX values below 1 mg organically bound halogen per liter, said method comprising adsorbing the halo-organic pollutants on iron (III) hydroxy complexes formed in situ by the hydrolysis of iron (III) salts in the presence of a further adsorption agent and separating the adsorption agents in flocculent form at pH 7 to 10, said method including determining the $Fe^{2+}$ content; of the water, if necessary adjusting the $Fe^{2+}$ content of the water to 20 to 1000 mg $Fe^{2+}$ per liter water by addition of an iron (II) salt, adding an oxidation agent for converting $Fe^{2+}$ into $Fe^{3+}$, after any adjustment of the $Fe^{2+}$ content, in an amount at least sufficient for the oxidation of at least 20 mg $Fe^{2+}/l$ and at most sufficient for the oxidation of all the $Fe^{2+}/l$ present in the presence of any other components which can be oxidized practically instantaneously, in a manner similar to $Fe^{2+}$ under the conditions of the reaction, the second adsorption means being a precipitated or pyrogenic silica having a specific surface of above 50 $m^2/g$ and the amount of said second absorption means being 50 to 1000 mg/l during the flocculation of the iron (III) hydroxy complexes.

2. A method as set forth in claim 1 in which the water to be treated is waste dump seepage water or contaminated ground water and that the AOX content comprises halo-organic pollutants containing 1 to 4 carbon atoms.

3. A method as set forth in claim 1 or claim 2 in which the AOX content is lowered to values below 0.2 mg/l.

4. A method as set forth in claim 3 in which the AOX content is lowered to values below 0.1 mg/l.

5. A method as set forth in claim 1 or claim 2 in which the oxidation agent is an inorganic active oxygen compound.

6. A method as set forth in claim 5 in which the oxidation agent is a member of the group consisting of persulfates, percarbonates and hydrogen peroxide.

7. A method as set forth in claim 1 or claim 2 in which the $Fe^{2+}$ content of the waste water is or is adjusted to 50 to 400 mg $Fe^{2+}/l$ and essentially the entire $Fe^{2+}$ present is converted into $Fe^{3+}$ by the addition of the oxidation agent.

8. A method as set forth in claim 7 in which the $Fe^{2+}$ content of the waste water is or is adjusted to 100 to 200 mg $Fe^{2+}/l$.

9. A method as set forth in claim 1 or claim 2 in which the amount of silicic acid added is 50 to 500 mg/l and the silicic acid is added to the water before the oxidation.

10. A method as set forth in claim 9 in which the amount of silicic acid is 50 to 200 mg/l.

11. A method as set forth in claim 1 or claim 2 in which the iron (II) salt as well as the oxidation agent are added in the form of aqueous solutions to the water to be treated and the amounts added are controlled by measuring the $Fe^{2+}/Fe^{3+}$ redox potential.

12. A method as set forth in claim 11 in which a redox potential in the range of +450 to 600 mV is established, using a platinum/Thalamid electrode, by adding an aqueous iron (II) salt solution and hydrogen peroxide is subsequently added as an oxidation agent until the redox potential assumes a value of +980 mV.

13. A method as set forth in claim 1 in which the water contains other organic and/or inorganic pollutants.

* * * * *